Jan. 19, 1960
S. ERDELYAN
2,921,642
VEHICLE WALL CONDUIT CONNECTOR
Filed July 26, 1957
2 Sheets-Sheet 1
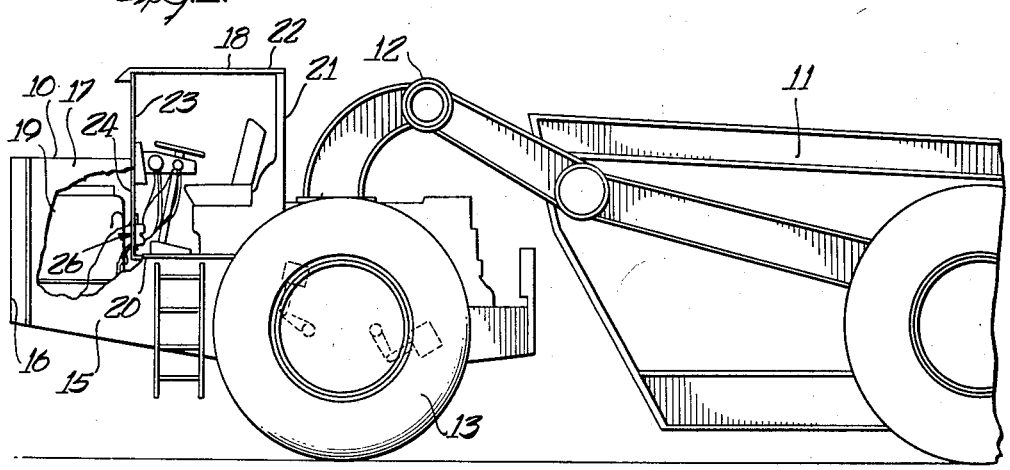
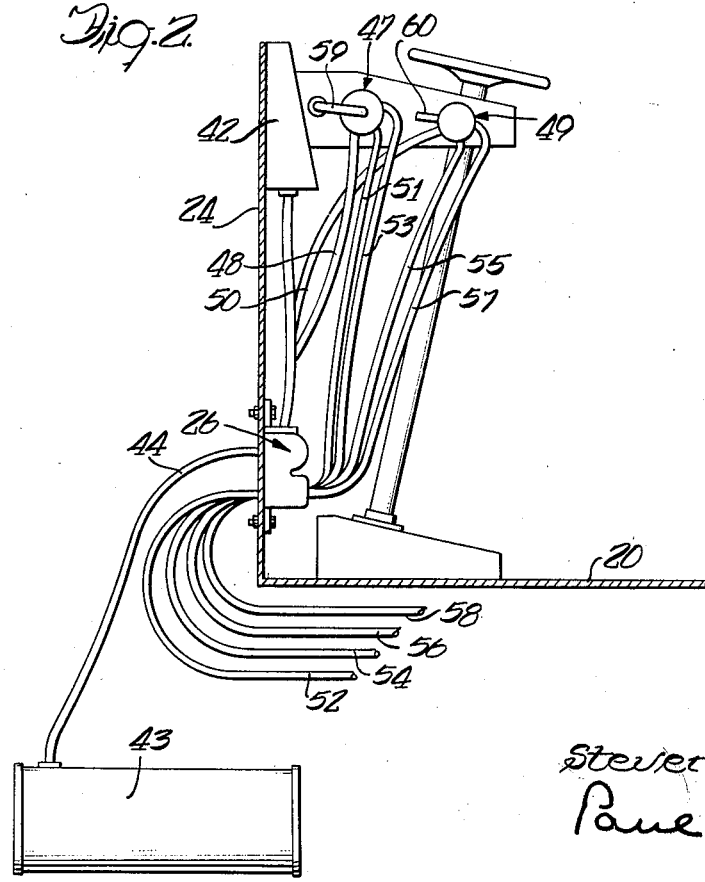

Jan. 19, 1960 — S. ERDELYAN — 2,921,642
VEHICLE WALL CONDUIT CONNECTOR
Filed July 26, 1957 — 2 Sheets-Sheet 2
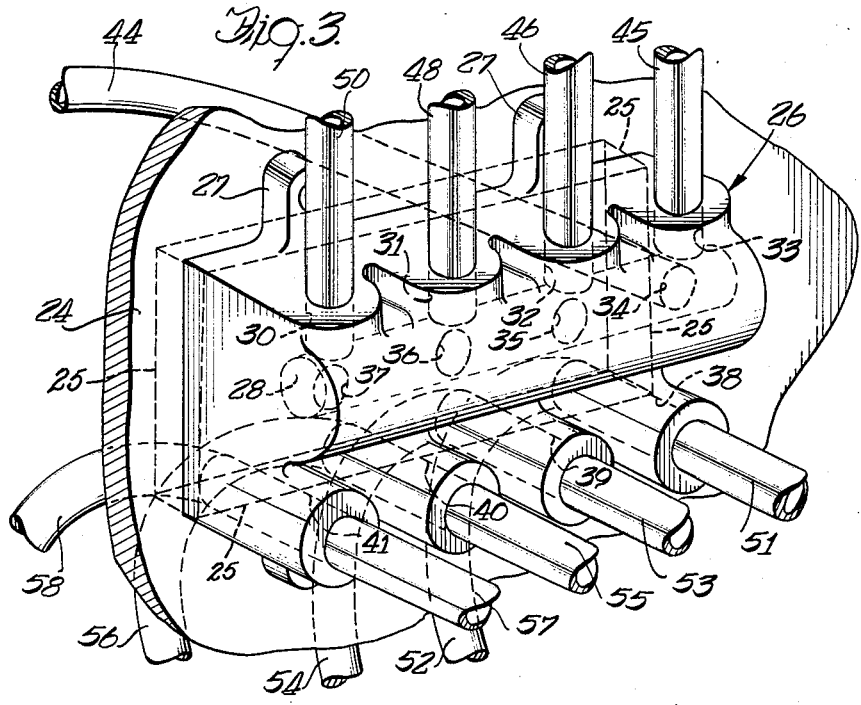
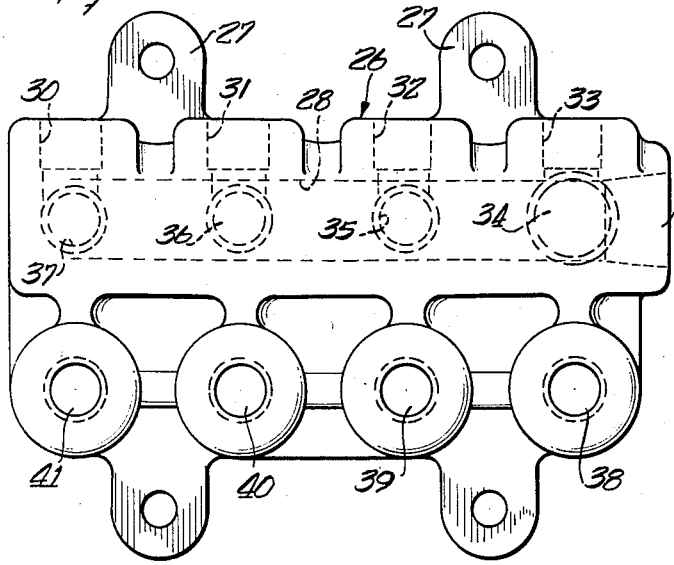
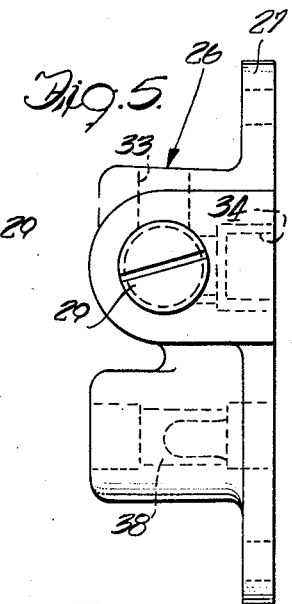
Inventor
Steven Erdelyan
Paul O. Pippel
Attorney United States Patent Office 2,921,642
Patented Jan. 19, 1960

2,921,642
VEHICLE WALL CONDUIT CONNECTOR

Steven Erdelyan, Glen Ellyn, Ill., assignor to International Harvester Company, Chicago, Ill., a corporation of New Jersey Application July 26, 1957, Serial No. 674,377

1 Claim. (Cl. 180—90)

This invention relates to means for connecting a plurality of conduits on opposite sides of the wall of a motor vehicle.

An object of the invention is to mount a single conduit connector on the wall of a motor vehicle so that all conduits intended to be passed through the wall may be attached to the conduit connector thereby preventing the making of a hole in the wall for each conduit and mounting a bulkhead fitting in each hole.

Another object of the invention is to provide an arrangement which is more compact and contains less parts and is less expensive than the arrangement heretofore used.

The foregoing and other objects of the invention will be apparent from the construction and arrangement illustrated in the accompanying drawings wherein:

Figure 1 is a side elevational view of a tractor and a bottom dump wagon attached to the tractor, Figure 2 is a vertical longitudinal sectional view through the tractor fire wall.

Figure 3 is a perspective view of the conduit connector shown mounted in the fire wall with attached conduits leading from the conduit connector, Figure 4 is a detail elevational view of one face of the conduit connector, and Figure 5 is a detail elevational view of one end of the conduit connector.

A wall separates the engine from the cab of a motor vehicle. In the past it has been the practice to make a hole in the wall and mount a bulkhead fitting in the hole for each fluid conduit passing through the wall. Since there were a large number of fluid conduits to be passed through the wall a large number of holes had to be made in the wall and a bulkhead fitting mounted in each hole. This arrangement was not compact and because of the bulkhead fittings required was expensive. The invention proposes a conduit connector for the wall of a motor vehicle. The wall is provided with an opening and a conduit connector is mounted in the opening. The conduit connector is provided with a large number of passages so that a conduit on the engine side for example may be attached to the conduit connector and another conduit on the cab side of the wall attached to the conduit connector with both conduits being in communication with the same passage in the conduit connector so that fluid may be passed from one side of the wall to the other. All conduits are attached to this conduit connector so that it is necessary to make only one hole in the wall. This arrangement is more compact and is made up of less parts and it is less expensive since no bulkhead fittings are required.

In the drawings, 10 generally designates a tractor and 11 a bottom dump wagon hitched to the tractor by a fifth wheel assembly 12. The tractor 10 is comprised of wheels 13, a frame 15, and a body 16. The body 16 includes a hood 17 and a cab 18. A power means or internal combustion engine 19 is provided for propelling the tractor 10. The cab 18 includes a floor 20 and a back wall 21 extending upwardly from the floor and a top wall 22 extending forwardly from the back wall and a front wall 23 extending downwardly from the top wall to a location slightly above the hood 17 and a fire wall 24 extending from wall 23 to the floor.

A rectangular-shaped opening 25 is provided in the fire wall 24. A manifold 26 is disposed over the opening 25 and is secured to the fire wall 24 by means of bolts (not shown) suitably positioned through the openings of flanges 27. The manifold 26 is comprised of a chamber 28 extending inwardly from one side thereof and terminating at a location adjacent the other side thereof with the outer part of the chamber being provided with threads in which is disposed a threaded plug 29. Four holes 30, 31, 32 and 33 extend inwardly from the top of the manifold 26 until they come into communication with the chamber 28. These holes 30, 31, 32 and 33 are adjacent the interior of the cab 18. A large hole 34 extends inwardly from the face of the manifold 26 adjacent the engine 19 until it comes into communication with the chamber 28. Three smaller holes 35, 36 and 37 also extend inwardly from the face of the manifold 26 adjacent the engine 19 until they come into communication with the chamber 28. The hole 35 is connected to a conduit leading to a governor in the engine compartment which controls a compressor in the compartment that is connected communicatively to the compressed air tank 43. The hole 36 is connected to a conduit leading to a thermostatically operated air control valve that controls the shutter on the radiator. The hole 37 is connected to a conduit leading to the clutch air valve which in turn supplies air to the clutch cylinder for power assistance in disengaging the clutch. Four holes 38, 39, 40 and 41 extend completely through the manifold 26. An instrument panel 42 is mounted interiorly of the cab 18 on the firewall 24. A compressed air tank 43 is mounted in the tractor 10 and a conduit 44 is connected to the tank and to the large hole 34 in the manifold 26. A conduit 45 is connected to the hole 33 and leads to an air gage on the instrument panel 42. A conduit 46 is connected to the hole 32 and leads to the windshield wipers and air horn for operating them. The dump wagon 11 has dumping doors in its bottom. A control valve 47 is mounted on the instrument panel for opening and closing the doors on the dump wagon 11. A conduit 48 is connected to the hole 31 in the manifold and leads to the control valve 47. Turning brakes are provided for the rear wheels 13 of the tractor so that the tractor may be steered. A control valve 49 is mounted on the instrument panel for operating the turning brakes. A conduit 50 is connected to the hole 30 of the manifold and leads to the control valve 49. A conduit 51 leads from the control valve 47 and is connected to the hole 38 in the manifold and a conduit 52 is connected to hole 38 and leads to hydraulic means on the dump wagon so that the doors on the dump wagon may be opened. A conduit 53 leads from the control valve 47 and is connected to the hole 39 in the manifold and a conduit 54 is connected to hole 39 and leads to the hydraulic means on the dump wagon so that the doors on the dump wagon may be closed. A conduit 55 leads from the control valve 49 to the hole 40 in the manifold and a conduit 56 leads from hole 40 to the turning brakes for operating the brakes. A conduit 57 leads from the control valve 49 to the hole 41 in the manifold and a conduit 58 leads from hole 41 to the turning brakes for operating the brakes. Air under pressure is supplied from the compressed air tank 43 and flows through conduit 44 through hole 34 into chamber 28 of the manifold. From chamber 28 the air flows out hole 33 into conduit 45 to the air gage and out hole 32 into conduit 46 to the windshield wipers and air horn and out hole 31 into conduit 48 to the control valve 47 and out hole 30 into conduit 50 to the control valve 49. By moving a handle 59 on control valve 47 air flows into conduit 51 then through hole 41 in the manifold into conduit 52 to the hydraulic means to open the dump doors on the dump wagon 11. By moving the handle 59 on control valve 47 in the opposite direction air flows into conduit 53 and then into hole 40 in the manifold and into conduit 54 to the hydraulic means to close the dump doors on the dump wagon 11. By moving a handle 60 on control valve 49 air flows into conduit 55 and then through hole 39 in the manifold into conduit 56 to the turning brakes to steer the tractor in one direction. By moving the handle 60 on control valve 49 air flows into conduit 57 and then through hole 38 in the manifold into conduit 58 to the turning brakes to steer the tractor in the opposite direction. Since all of the conduits go to the manifold it is not necessary to make a hole in the fire wall for each conduit to go through and if holes were provided in the fire wall for each conduit a bulkhead fitting would have to be mounted in each hole. The manifold is less expensive since it would cost less than a number of individual bulkhead fittings and is made up of only one part whereas bulkhead fittings would mean a large number of parts and since the manifold is made up of only one part it is more compact than the bulkhead fittings. The conduit connector could be mounted on the floor or any wall where conduits are intended to be passed from the engine into the cab or vice-versa.

What is claimed is:

In combination with a vehicle having a cab with a driver's area therein, and propelling power means therefor, said cab having a fire wall provided with an opening therethrough disposed between said driver's area and said power means; a means for communicatively connecting independently a plurality of first fluid conduits positioned on one side of said wall with a plurality of second fluid conduits positioned on the other side of said wall comprising a multi-passage conduit connector rigidly mounted on said fire wall and extending over said opening, said connector having a manifold with a plurality of first holes in spaced relation communicatively connected thereto, at least one of said first holes being positioned transversely through said connector in communicative relation with a corresponding first fluid conduit adjacent to said opening, a plurality of said second fluid conduits positioned in communication with corresponding first holes of said manifold, said connector having a plurality of second holes corresponding to the remaining said first fluid conduits and second fluid conduits, said second holes in said connector being disposed transversely therethrough in spaced relation, each of said remaining first fluid conduits being connected to each of said corresponding second holes at the ends adjacent to said opening, and the other ends of said second holes being connected correspondingly to each of the remaining said second fluid conduits whereby said first fluid conduits on one side of said fire wall are respectively connected communicatively with said second fluid conduits on the other side of said fire wall in corresponding relation through said connector.

References Cited in the file of this patent

UNITED STATES PATENTS

| | | |
|---|---|---|
| 1,850,937 | Messinger | Mar. 22, 1932 |
| 2,286,952 | Cannon et al. | June 16, 1942 |
| 2,457,478 | Letvin | Dec. 28, 1948 |
| 2,632,262 | Whittey | Mar. 24, 1953 |
| 2,698,758 | Ronning | Jan. 4, 1955 |
| 2,754,145 | Mackey | July 10, 1956 |

FOREIGN PATENTS

| | | |
|---|---|---|
| 294,132 | Italy | Mar. 12, 1932 |